(12) United States Patent
Grube et al.

(10) Patent No.: US 8,394,730 B2
(45) Date of Patent: Mar. 12, 2013

(54) COATING FOR GRANULATED PRODUCTS TO IMPROVE GRANULE ADHESION, STAINING, AND TRACKING

(75) Inventors: Louis L. Grube, Bound Brook, NJ (US); Michael D. DeSouto, Somerset, MA (US); Anthony Ruffine, Lebanon, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 1325 days.

(21) Appl. No.: 11/755,452

(22) Filed: May 30, 2007

(65) Prior Publication Data

US 2008/0038513 A1 Feb. 14, 2008

Related U.S. Application Data

(63) Continuation-in-part of application No. 10/883,050, filed on Jul. 1, 2004, now abandoned.

(51) Int. Cl.
*B32B 27/14* (2006.01)
*B32B 5/16* (2006.01)

(52) U.S. Cl. ........ 442/72; 442/64; 442/71; 442/73; 442/74; 442/75; 442/164

(58) Field of Classification Search .......... 442/59, 442/64, 71, 72, 73, 74, 75, 164, 180
See application file for complete search history.

(56) References Cited

U.S. PATENT DOCUMENTS

| | | | |
|---|---|---|---|
| 3,276,906 A * | 10/1966 | Nielsen | 427/385.5 |
| 4,135,029 A | 1/1979 | Pfeffer | |
| 4,258,098 A | 3/1981 | Bondoc et al. | |
| 4,284,470 A | 8/1981 | Bondoc | |
| 4,430,158 A | 2/1984 | Jackey et al. | |
| 4,472,243 A * | 9/1984 | Bondoc et al. | 162/135 |
| 4,542,068 A | 9/1985 | Whichard | |
| 5,011,726 A | 4/1991 | Chich et al. | |
| 5,240,760 A | 8/1993 | George et al. | |
| 5,286,544 A | 2/1994 | Graham | |
| 5,362,566 A | 11/1994 | George et al. | |
| 5,484,477 A * | 1/1996 | George et al. | 106/499 |
| 5,965,257 A | 10/1999 | Ahluwalia | |
| 6,426,309 B1 | 7/2002 | Miller et al. | |
| 2002/0066233 A1 | 6/2002 | McArdle | |
| 2002/0160151 A1 * | 10/2002 | Pinault et al. | 428/144 |
| 2005/0072114 A1 * | 4/2005 | Shiao et al. | 52/782.1 |

* cited by examiner

*Primary Examiner* — Jenna Johnson
(74) *Attorney, Agent, or Firm* — Thompson Hine L.L.P.

(57) ABSTRACT

A building material product and a method of making building material products, having increased resistance to granule rub off and staining. The building material product comprises a substrate having embedded granules and an acrylic latex coating positioned on the granules, where the polymer of the acrylic latex coating has the repeating structural unit $[CH_2-C(R^1)(R^2)]$, where $R^1$ is hydrogen or $C_1$-$C_8$ alkyl; $R^2$ is hydrogen, cyano or —COOR; and R is a linear or branched hydrocarbon containing 1-22 carbon atoms, with the proviso that $R^1$ and $R^2$ are both not hydrogen. The method includes applying this acrylic latex water based composition to a granule embedded substrate.

17 Claims, No Drawings

COATING FOR GRANULATED PRODUCTS TO IMPROVE GRANULE ADHESION, STAINING, AND TRACKING

RELATED APPLICATIONS

The present application is a continuation-in-part (CIP) of U.S. Ser. No. 10/883,050, now abandoned, which was filed Jul. 1, 2004

FIELD OF INVENTION

This invention relates to granule surface building products, and more particularly, to granule surface building material products having exceptional granule rub loss qualities, improved staining and improved tracking at high temperatures.

BACKGROUND OF INVENTION

Building products have utilized granule coated or embedded surfaces in a variety of anti-slip, weather-resistant, fire-resistant, and decorative surface applications. These building products include asphalt and non-asphaltic materials.

Asphalt building products may comprise felt or fabric stock impregnated with asphalt and covered with weather resistant mineral granules. Some examples of asphalt building products include asphalt shingles, asphalt siding, and rolled roofing. Typically, rolled roofing comprises modified bitumen asphalt including a polymer filling and asphalt roofing shingles comprise non-modified bitumen asphalt, which may include limestone as an additive. Alternatively, rolled roofing may comprise non-modified bitumen asphalt. Modified bitumen asphalt shingles have also been contemplated. Typical asphalt products have a glass or polyester substrate and a multitude of granules placed thereon and have served as relatively inexpensive alternatives to tile, slate and wood building products.

The granules serve to protect and provide coloring to the asphalt building product. For instance, granules serve to provide coloring to shingles and rolled roofing products and thus to the roof. Additionally, the granular material generally protects the underlying asphalt coating from damage due to exposure to light, in particular ultraviolet (UV) light. That is, the granules reflect light and protect the asphalt from deterioration by photo-degradation. In addition, such granular material improves fire resistance and weathering characteristics. In general, granules are embedded in the coating asphalt by the application of pressure and are retained therein by adherence to the asphalt.

Non-asphaltic building materials, such as plastic siding panels for surfacing walls and roofs of buildings, may comprise extruded or pressed thermo-plastic materials such as polyvinylchloride (PVC). Plastic flooring is another example of non-asphaltic building materials. Similar to asphalt building products, non-asphaltic building products comprising coated or embedded granules can have improved fire resistance, weathering characteristics and aesthetic appearance.

Good adherence of the granules to the building product is beneficial. In the case of some asphaltic roofing products, loss of granules reduces the life of the roof, since it is associated with acceleration of photo-degradation of the asphalt. In addition, the aesthetics of the roofing system may be compromised if granules are lost.

Granule loss can occur due to physical abrasion of the granular surface. This may occur during installation of the building material product; during maintenance; or may result from environmental conditions. Building products are especially susceptible to granule rub loss and tracking at elevated temperatures, in which granule loss and tracking may occur when an individual walks on the roof, leaving footprints or scuffs permanently imprinted into the roofing or walk on the building product while it is stored or shipped.

In asphalt building products, as granules are secured to the asphalt surface, there is a tendency for oils in the asphalt surface to creep onto or be adsorbed on the granules' surfaces. This creeping or adsorption of the asphalt oils on the granules' surface causes discoloration or staining of the granules and hence reduces the building material products aesthetic effect.

In one embodiment, the present invention provides granular surface building products, and a method of producing same, having increased protection against granule rub off, improved resistance to tracking, and improved resistance to discoloration than previously known in granular surface building materials.

SUMMARY OF THE INVENTION

The present disclosure relates to granular surface building products for roofs, sidewalls and other surfaces such as, but not limited to, asphaltic and non-asphaltic roofing materials, wherein the granular surface building materials have increased resistance to granule rub off, increased resistance to staining and decreased tracking. In accordance with the present invention, an acrylic latex coated granule surface building product having increased rub-off protection is provided. The acrylic latex coated granule surface building product comprises a substrate having granules embedded and/or adhered therein and coated with an acrylic latex polymer, applied from a latex composition, wherein the acrylic polymer has the repeating structural formula $[CH_2-C(R^1)(COOR^2)]$, where $R^1$ is hydrogen or $C_1$-$C_8$ alkyl; $R^2$ is hydrogen, cyano or $C_1$-$C_8$ alkyl.

Another aspect of the present invention is a process of making an acrylic latex coated granuled asphalt building product. In this process, an asphalt coating is applied to a glass fiber mat to form an asphalt product. Granules are thereupon deposited atop the asphalt substrate followed by dry embedding of the granules into the asphalt laden glass fiber mat by pressure. The granule embedded asphalt mat is then coated with an acrylic latex water-based composition. The latex may be applied using conventional processes such as, but not limited to, spraying or dipping. Additionally, the acrylic latex may be applied in-line during the manufacturing process, wherein the latex is applied following pressure embedding of the granules prior to cutting and packaging of the asphalt-roofing product.

Following the application of the acrylic latex coating, the structure is then dried to form an acrylic latex coated granule surface asphalt building product having increased rub off resistance, improved tracking resistance, and resistance to staining. Optionally, as an alternative to applying the acrylic latex coating during the manufacturing process, the acrylic latex coating may be applied following the production of the granule surface asphalt building product.

Another aspect of the present invention is a process of making an acrylic latex coated granule surface non-asphaltic building product. A non-asphaltic substrate is first provided which may include such conventional substrates as vinyl, polyvinyl chloride (PVC), plastisol or organosol layers as commonly used in vinyl flooring, siding and roofing. The granules may be embedded into the non-asphaltic substrate by heating the non-asphaltic substrate close to its softening temperature, dispersing granules across the surface of the non-asphaltic substrate, and then embedding the granules into the surface of the non-asphaltic substrate with a press.

The granule embedded non-asphaltic substrate is then coated with an acrylic latex water-based composition. The acrylic latex may be applied by any suitable coating technique such as spraying, dipping, knife coating or roll coating, with roll coating being preferred. Additionally, the acrylic latex may be applied in-line during the manufacturing process, wherein the latex is applied following pressure embedding of the granules prior to cutting and packaging of the non-asphaltic building products. Optionally, as an alternative to applying the acrylic latex coating during the manufacturing process, the acrylic latex coating may be applied following the production of the non-asphaltic building product.

Following the application of the acrylic latex coating, the structure is then dried to form a granule surfaced building product having increased rub off resistance and resistance to staining.

DETAILED DESCRIPTION OF THE INVENTION

The building product of the present invention includes an asphaltic or non-asphaltic substrate embedded with granules, which is coated with an acrylic latex coating. The acrylic polymer employed in the latex composition coating the substrate embedded with roofing granules, has the repeating structural unit $[CH_2—C(R^1)(COOR^2)]$, where $R^1$ is hydrogen or $C_1$-$C_8$ alkyl; $R^2$ is hydrogen, cyano or $C_1$-$C_8$ alkyl. In a preferred embodiment, the polymer employed in the latex composition is a homopolymer or copolymer of methacrylic acid, a methacrylic ester, an acrylate ester or acrylonitrite.

The granules can be, for example, of a weather-resistant mineral rock such as greenstone, nephelene syenite, common gravel, slate, gannister, quartz, quartzite, greystone, argillite, coal slag, copper slag, nickel slag, etc. The granules may be coated with a ceramic coating comprising a reaction product of an alkali metal silicate and an aluminosilicate. Typical granules have sizes ranging from about 420-1680 micrometers (40 to 12 mesh US). The use of somewhat larger or smaller granules, however, is within the scope of this invention, provided the granules have a size that permits their functioning as granules in building products. Preferably, the granules are embedded in the substrate at a depth of about ¼ to ¾ of the diameter of the granules.

The substrate may be an asphaltic or non-asphaltic material. Asphalt substrates typically include a base mat covered with asphalt and filled with a mineral filler or stabilizer. Asphalt is a cementitious material having bitumens as a main constituent. Optionally, the asphalt may be admixed with fine mineral filler, such as limestone, talc, mica or sand.

Non-asphaltic substrates include a variety of building materials such as vinyl flooring, vinyl floor tiles, vinyl siding, etc. The present invention is particularly applicable to rigid and/or flexible plastic substrates manufactured from conventional thermoplastic materials such as polyolefin (e.g. polyethylene), polycarbonate, polyvinyl chloride (PVC), polyvinyl fluoride, acrylic resins, acrylonitrile, butadiene, styrene, copolymers of acrylonitrile, butadiene and styrene (ABS), etc. PVC is a preferred plastic for the non-asphaltic substrate of the invention.

In addition to the above-described plastics, the non-asphaltic substrate may comprise glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenolformaldehyde resin fibers, aromatic and aliphatic polyamide fibers, polyacrylamide fibers, polyacrylimide fibers or mixtures thereof which may include bicomponent fibers.

The material of the non-asphaltic material can contain a filler such as calcium carbonate, talc, silicates, wood flour or any other suitable filler as known within the skill of the art.

Flexible materials used as non-asphaltic substrates in building products of the present invention may be further supported by asbestos sheet, woven or non-woven fibrous web, other plastisol layers, plastisol on felt backing, etc. It should be understood that where appropriate, a non-asphaltic substrate of the invention may include a layer having printing or other decorative effects superimposed thereon.

In another aspect of the present invention, a process of making granular surface building products having improved rub off resistance is provided. In a first process step, a building material substrate is provided, which provides the base structure for the subsequently formed granular surface building product. Suitable building material substrates include interior and exterior sheet flooring, tile flooring, rolled roofing, shingles, paneling, siding, etc.

In one embodiment of the present invention the granular surfaced building product may comprise an asphalt building material substrate. In this embodiment of the inventive process, a base mat, which may be a glass fiber mat or a polymeric web, bound by a resin binder, is provided. The resin binder may be a thermosetting resin such as urea-formaldehyde resin, a phenol-formaldehyde resin or other phenolic resin. Alternatively, the resin binder may be a thermoplastic resin such as polyvinyl alcohol, polyvinyl acetate, an acrylic resin, polyvinyl acetate and bone glue. The binder may also include conventional polymeric modifiers.

The base mat is then coated with asphalt, which may include optional mineral fillers, to form an asphalt substrate. The term "asphalt substrate" denotes that the substrate can comprise asphalt or modified asphalt. When forming an asphalt building product the asphalt substrate is preferably a non-modified bitumen that is applied at a preferred temperature ranging from about 325° F. to about 450° F. In one embodiment, wherein asphalt shingles are prepared the asphalt coating includes limestone as an additive. In another embodiment, wherein rolled roofing is formed, the asphalt is preferably modified with one or more polymer additives. The modified asphalt can be applied at a preferred temperature ranging from about 300° F. to about 425° F. More preferably, the modified asphalt is applied at a temperature of approximately 365° F.

In another embodiment of the invention, the building material substrate is a non-asphaltic material. The non-asphaltic material may be a plastic (polymeric) material, preferably being a thermoplastic material, such as PVC. In the embodiment in which the non-asphaltic substrate comprises a plastic material, the non-asphaltic substrate may be constructed by any suitable conventional technique such as, but not limited too: compression and transfer molding, injection molding, extrusion, blow molding, casting, or conventional vacuum forming operations.

Granules are then applied to the building material substrate. Granules may be applied to asphalt substrates, for example, by dropping them onto a hot asphalt surface. The roofing granules are then pressed into the asphalt substrate surface, where the granules are embedded to a depth of about ¼ to ¾ the diameter of the granules into the asphalt building material substrate.

In the embodiments of the present invention wherein the substrate comprises a non-asphaltic material such as a thermoplastic, the granules may be applied to the thermoplastic substrate by softening the surface of the thermoplastic substrate and then applying the granules, wherein the granules are pressed into the softened surface of the thermoplastic substrate. The thermoplastic substrate may be softened by heating the thermoplastic substrate to its softening temperature using conventional processes such as infrared heating, air knife heating, heated blowers, heated rolls, heated oven and/or like processes.

Following the application of the granules, an acrylic latex coating is applied. The acrylic latex coating is applied from an acrylic latex water based composition comprising from about 20% to about 90% water. As stated above, the acrylic polymer of the latex has the repeating structural formula recited above and is preferably a homopolymer or copolymer of methacrylic acid, methacrylic ester or acylonitrile. In a particularly preferred embodiment, the polymer of the latex is a copolymer of an acrylic ester and styrene. In this preferred embodiment, a latex of the styrene/acrylate copolymer is dispersed in water such that copolymer comprises about 49% to about 51% and water is present in a concentration of said percentages being by weight, based on the total weight of the latex composition.

In this preferred embodiment, the latex dispersion of a copolymer of styrene and butyl acrylate includes trace amounts of unreacted styrene and butyl acrylate monomers. Specifically, the latex, includes each of these monomers in a concentration of less than about 200 parts per million (ppm). In this preferred embodiment the polymeric particles of a size in the range of between about 120 and 140 nanometers.

The acrylic latex may be applied at any temperature by any conventional method including dipping, roller application, brushing, or spraying. Independent of the method of application, the acrylic latex water based coating is applied in the amount such that the weight of acrylic polymer is present in a concentration of from about 0.5 g/ft$^2$ to about 20 g/ft$^2$; more preferably, from about 1.0 g/ft$^2$ to about 10.0 g/ft$^2$, and even more preferably from about 2.5 g/ft$^2$ to about 5.0 g/ft$^2$. The acrylic latex water based coating is preferably applied under ambient temperature and pressure. Alternatively, the acrylic latex coating may be applied to encapsulate the granules prior to the granules being embedded in the substrate.

The acrylic latex coating is then dried, using any conventional drying method. Among the conventional drying means that may be utilized are infrared heating, air knife drying, heated blowers drying, heated rolls, heated oven drying and the like. The drying time typically ranges from less than 30 seconds to about five minutes. Following drying, the acrylic latex coated granular surface building material product is then cut and packaged. The granular surfaced building products of the present invention, which have been treated with the acrylic latex coating, are then used in the conventional manner known to those skilled in the art.

The following examples are given to illustrate the scope of the present invention. Because these examples are given for illustrative purposes only, the invention should not be deemed limited thereto.

Example 1

Granule Adhesion Measurement of Latex Coated Asphalt Roofing Products

Latex coated test samples and control samples were produced and tested for granule adhesion in accordance with ASTM standard D 4977 utilizing a 3M RTM 400 four-head tester granule adhesion test apparatus, a 3M abrasion test brush and balance.

Control samples were first produced from granule embedded rolled polymer modified asphalt-roofing. The rolled asphalt-roofing comprised a non-woven polyester mat substrate having a polymer filled asphalt coating and embedded granules. Six control samples were prepared from a rolled asphalt-roofing sheet by cutting six specimens, wherein two of the samples were cut from a middle region of the sheet adjacent to the machine direction; two samples were cut two inches in from the non-selvege edge adjacent to the machine direction and two samples were cut two inches in from the selvege edge adjacent to the machine direction, the machine direction being the direction in which the asphalt-roofing product is produced on a line prior to being cut.

A second set of samples in which a latex of a copolymer of butyl acrylate and styrene was applied to the asphalt rolled roofing in accordance with the present invention was prepared in accordance with the procedure utilized in the preparation of the control samples.

Each latex coated test sample and control sample, after being weighed, was then secured into a 3M RTM 400 four-head tester granule adhesion test apparatus, incorporating a 3M abrasion test brush. The test brush then contacted the surface of the latex coated test sample, where the test brush was then stroked longitudinally across the test sample for 50 cycles, where one cycle equals 2 strokes. The test samples where then weighed a second time. The difference between the first weight and second weight represented the granule rub loss. The test was repeated for each latex coated test sample and each control sample. The results of the granule loss measurements are provided in Table 1.

The granule rub loss sample is under pressure from the 3M RTM 400 abrasion test. Friction between granules and the bristles in the brush produce heat. Therefore, improved rub loss directly correlates with improved tracking resistance, as measured by this test. If the depth at which the bristles penetrate the test sample decreases, an increase in tracking resistance is present.

TABLE 1

| GRANULE RUB LOSS | | | | | | | | |
|---|---|---|---|---|---|---|---|---|
| | Sample No. | | | | | | | |
| | 1 | 2 | 3 | 4 | 5 | 6 | AVERAGE | STD DEV |
| Granule loss for samples having no coating (grams) | 1.53 | 3.37 | 2.84 | 3.19 | 2.99 | 3.29 | 2.87 | .68 |
| Granule loss for samples having latex coating (grams) | .09 | .08 | .12 | .12 | .15 | .96 | .25 | .35 |

Example 2

Granule Stain Testing of Latex Coated Asphalt Roofing

Latex coated test samples and control samples were produced and tested for granule staining in accordance with the below disclosed testing procedure utilizing a force hot dry oven and a Macbeth color surveillance system.

Control samples were first cut from granule embedded rolled modified asphalt-roofing. The asphalt-roofing comprised a non-woven polyester substrate coated with polymer filled asphalt upon which granules were embedded. Three 10"×10" control samples were prepared from rolled asphalt-roofing where a first control sample was cut two inches in from the selvege edge, another sample was cut from a middle region of the sheet; and a third sample was cut four inches in from the non-selvege edge. Three 10"×10" latex coated test samples were then cut in the above manner from a latex coated asphalt-roofing product. The tests specimen was then heated in a force hot dry oven for approximately four hours at a temperature of about 210° F. The test specimens were then cooled to room temperature.

The Macbeth color surveillance system was then calibrated using a white ceramic calibration tile. Following calibration, the lightness of the test samples was then measured and recorded using the Macbeth color surveillance system. Measurements of the test samples were taken in both machine and transverse directions. The Macbeth color surveillance system expresses lightness numerically, where a value of 0 corresponds to black and increasing numerical values indicate increasing lightness up to a value of 100 indicative of pure white. Variations in the lightness of the asphalt coated rolled roofing samples indicates staining. The results of the lightness measurements are provided in Table 2.

TABLE 2

STAINING

| UNCOATED SAMPLE 1 | | LATEX COATED SAMPLE 3 | |
| --- | --- | --- | --- |
| Transverse direction | 69.31 | Transverse direction | 67.15 |
| Machine direction | 68.33 | Machine direction | 67.28 |
| AVERAGE | 68.82 | AVERAGE | 67.215 |

| SAMPLE 2 | | SAMPLE 4 | |
| --- | --- | --- | --- |
| Transverse direction | 53.89 | Transverse direction | 61.81 |
| Machine direction | 54.71 | Machine direction | 60.71 |
| AVERAGE | 54.3 | AVERAGE | 61.26 |
| Difference between sample 1 average and sample 2 average | 21.1% | Difference between sample 3 average and sample 4 average. | 8.9% |

% IMPROVEMENT FOR LATEX COATED SAMPLES OVER UNCOATED SAMPLES - 59%

Summary of the Results

The results summarized in Table 1 indicate that latex coated asphalt roofing products have an increased resistance to rub loss and substantially better tracking resistance at elevated temperature when compared to similarly prepared roofing products without a latex coating. More specifically, the results summarized in Table 1 indicate that granule loss is decreased by approximately 90% in latex coated roofing products.

The results summarized in Table 2 indicate that an increase in resistance to staining is achieved by coating asphalt-roofing products with a latex coating. Staining is indicated by a variation in lightness values between different and heat aged roofing products. Table 2 indicates that the lightness of uncoated asphalt rolled roofing varies by approximately 21% and that the lightness value of latex coated shingles varies by approximately 9%. Table 2 indicates an improvement in staining resistance by approximately 59% for latex coated shingles as compared to shingles without the inventive latex coating.

The above embodiments and examples are given above to illustrate the scope and spirit of the present invention. These embodiments and examples will make apparent, to those of ordinary skill in the art, other embodiments and examples. These other embodiments and examples are within the contemplation of the present invention. Therefore, the present invention should be limited only by the appended claims.

What is claimed is:

1. A building product comprising:
a substrate;
granules embedded in said substrate; and
an acrylic latex coating said granules, a polymer of said acrylic latex coating includes the repeating structural unit $[CH_2—C(R^1)(COOR^2)]$, where $R^1$ is hydrogen or $C_1$-$C_8$ alkyl; $R^2$ is hydrogen, cyano or $C_1$-$C_8$ alkyl;
wherein said granules are encapsulated in the acrylic latex coating prior to the granules being embedded in said substrate.

2. The building product of claim 1 wherein said acrylic latex coating comprises a homopolymer or copolymer of methacrylic acid, a methacrylate ester, an acrylate ester or acrylonitrile.

3. The building product of claim 1 wherein said acrylic latex coating is applied such that its concentration is in the range of between about 0.5 grams/square foot and about 20 grams/square foot.

4. The building product of claim 3 wherein said acrylic latex coating concentration is in the range of between about 1 gram/square foot and about 10 grams per square foot.

5. The building product of claim 1 wherein said granules are greenstone, nephelene syenite, common gravel, slate, ganister, quartz, sand, quartzite, greystone, argillite, coal slag, copper slag, or nickel slag.

6. The building product of claim 5 wherein said granules are coated with a ceramic coating comprising a reaction product of an alkali metal silicate and an aluminosilicate.

7. The building product of claim 1 wherein said substrate is coated with an asphalt coating.

8. The building product of claim 7 wherein said building product is rolled roofing and said asphalt coating is a modified bitumen having a polymer additive.

9. The building product of claim 7 wherein said building material product is a shingle and said asphalt coating is a non-modified bitumen.

10. The building product of claim 1 wherein said substrate comprises a glass fiber web or polymeric web bound by a resin binder.

11. The building product of claim 10 wherein said resin binder comprises a urea-formaldehyde resin, a phenol-formaldehyde resin, a phenolic resin, polyvinyl alcohol, polyvinyl acetate, an acrylic resin, polyvinyl acetate, or bone glue.

12. The building product of claim 1 wherein said substrate comprises a plastic material.

13. The building product of claim 12 wherein said plastic material comprises polyolefin, polycarbonate, polyvinyl chloride, polyvinyl fluoride, acrylic resins, acrylonitrile, butadiene, styrene, copolymers of acrylonitrile, butadiene or styrene.

14. The building product of claim 13 wherein said substrate further comprises a filler.

15. The building product of claim 14 wherein said filler comprises calcium carbonate, talc, asbestos, silicates, or wood flour.

16. The building product of claim 1 wherein said substrate comprises glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenolformaldehyde resin fibers, aromatic polyamide fibers, aliphatic polyamide fibers, polyacrylamide fibers, polyacrylimide fibers or mixtures thereof.

17. The building product of claim 1 wherein said building product is flexible flooring, floor tiles, siding, roofing panels, rolled roofing, or roofing shingles.

* * * * *